US012793869B2

(12) United States Patent
Schymik et al.

(10) Patent No.: US 12,793,869 B2
(45) Date of Patent: Nov. 10, 2026

(54) METHODS FOR ARRANGING ATOMS IN AN ARRAY OF OPTICAL TRAPS

(71) Applicants: Institut d'Optique Théorique et Appliquée, Palaiseau (FR); Centre National de la Recherche Scientifique, Paris (FR); UNIVERSITE PARIS-SACLAY, Gif-sur-Yvette (FR)

(72) Inventors: Kai-Niklas Schymik, Karlsruhe (DE); Vincent Lienhard, Paris (FR); Daniel Barredo, Oviedo (ES); Antoine Browaeys, Orsay (FR); Thierry Lahaye, Palaiseau (FR)

(73) Assignees: Institut d'Optique Théorique et Appliquée, Palaiseau (FR); Centre National de la Recherche Scientifique, Paris (FR); UNIVERSITE PARIS-SACLAY, Gif-sur-Yvette (FR)

( * ) Notice: Subject to any disclaimer, the term of this patent is extended or adjusted under 35 U.S.C. 154(b) by 570 days.

(21) Appl. No.: 18/252,094

(22) PCT Filed: Nov. 8, 2021

(86) PCT No.: PCT/EP2021/080980
§ 371 (c)(1),
(2) Date: May 8, 2023

(87) PCT Pub. No.: WO2022/101145
PCT Pub. Date: May 19, 2022

(65) Prior Publication Data

US 2023/0411035 A1 Dec. 21, 2023

(30) Foreign Application Priority Data

Nov. 10, 2020 (EP) .................................... 20306357

(51) Int. Cl.
*G21K 1/30* (2026.01)
*G06N 10/40* (2022.01)

(52) U.S. Cl.
CPC ............... *G21K 1/30* (2026.01); *G06N 10/40* (2022.01)

(58) Field of Classification Search
None
See application file for complete search history.

(56) References Cited

U.S. PATENT DOCUMENTS

2020/0185120 A1* 6/2020 Keesling Contreras ..................... G21K 1/006
2023/0282385 A1* 9/2023 Kim ....................... G21K 1/006 250/251

OTHER PUBLICATIONS

A. A. Hagberg et al; "Exploring network structure, dynamics, and function using NetworkX"; Proceedings of the 7th Python in Science Conference (SciPy2008); pp. 11-15; 2008 (5 pages).

(Continued)

*Primary Examiner* — Eliza W Osenbaugh-Stewart
(74) *Attorney, Agent, or Firm* — Maier & Maier, PLLC

(57) ABSTRACT

The present disclosure relates to a method for arranging atoms in a target array of optical traps with predefined positions comprising: generating a given number of target traps at said predefined positions; generating reservoir traps, said reservoir traps and said target traps forming a traps array; defining allowed paths between traps of the traps array; loading atoms in the traps array to generate an initial loaded traps array; determining the positions of the atoms in the initial loaded traps array; calculating a sequence of moves using a rearrangement algorithm based on said initial loaded traps array and said allowed paths; and applying the sequence of moves to rearrange the atoms in the traps array and form a final loaded traps array.

12 Claims, 10 Drawing Sheets

(56) References Cited

OTHER PUBLICATIONS

International Search Report issued in corresponding International Application No. PCT/EP2021/080980, mailed on Jan. 26, 2022 (4 pages).
Written Opinion issued in corresponding International Application No. PCT/EP2021/080980, mailed on Jan. 26, 2022 (10 pages).
M. Schlosser et al; "Assembled arrays of Rydberg-interacting atoms"; Journal of Physics B, Atomic Molecular and Optical Physics, Institute of Physics Publishing, vol. 53, No. 14, pp. 144001 (1-9); Jun. 16, 2020 (9 pages).
W. Lee et al; "Defect-free atomic array formation using Hungarian matching algorithm"; arXiv.org, Cornell University Library: pp. 1-7; Apr. 24, 2017 (7 pages).
D. Barrendo et al; "An atom-by-atom assembler of defect-free arbitrary 2d atomic arrays"; Science, vol. 354, pp. 1021 (1-7); 2016 (7 pages).
F. P. Preparata et al; Computational Geometry: An Introduction, Springer-Verlag, p. 85, 1985 (1 page).
F. P. Preparata et al; Computational Geometry: An Introduction, Springer-Verlag, pp. 209-210, 1985 (2 page).

* cited by examiner

530

540

METHODS FOR ARRANGING ATOMS IN AN ARRAY OF OPTICAL TRAPS

TECHNICAL FIELD OF THE INVENTION

The present disclosure relates to methods for arranging atoms in an array of optical traps and quantum processing systems implementing such methods.

BACKGROUND OF THE INVENTION

Over the last few years, single atoms trapped in an array of optical traps have become a prominent platform for quantum science, in particular for quantum simulation and quantum sensing. They allow single-atom imaging and manipulation, fast repetition rates, and high tunability of the geometry of the arrays. When combined with excitation to Rydberg states, these systems naturally implement quantum spin models, with either Ising or XY interactions. They can also be used to realize quantum gates with fidelities approaching those of the best quantum computing platforms.

An optical trap, also called optical tweezers in the present description, is an optical system configured to trap a single atom at a predefined location. The trapping is generally obtained by focusing lasers at said location to cool down the atom and maintain its position steady.

A general goal in quantum science is to obtain a fully-loaded array of traps, i.e. an array of optical traps with one atom being located in each trap of the array, wherein the positions of the traps are predetermined by a user. The array of traps with positions predetermined by the user is called a "target traps array" in the present description.

Standard methods for loading atoms in a traps array (i.e. filling the traps of the traps array with atoms) are stochastic procedures that are suitable to fill up only half of the traps in average, the other half of the traps being left empty after the loading.

Therefore, there has been interest in methods to improve the loading of the target traps array with atoms and obtain a fully-loaded traps array.

In D. Barredo, S. de Léséleuc, V. Lienhard, T. Lahaye, and A. Browaeys, *An atom-by-atom assembler of defect-free arbitrary 2d atomic arrays, Science* 354, 1021 (2016), a method to obtain a fully-loaded target traps array is demonstrated. In said method, an optical set-up comprising a spatial light modulator (SLM) is used to generate a traps array comprising target traps whose positions are predefined by a user and reservoir traps that are added to facilitate the loading of the atoms. The target traps form the "target traps array" and the ensemble comprising the target traps and the reservoir traps forms the "traps array".

In said method, the traps array is first loaded using a standard method, half of the traps of the traps array being statistically left empty in average. Afterwards, atoms in reservoirs traps are rearranged one-by-one into target traps by using a moving optical trap generated with an acousto-optic deflector (AOD). However, the atoms can only be moved along certain directions that are referred to as allowed path and the sequence of moves used to rearrange the atoms is calculated using a "shortest-moves-first" algorithm that prioritizes the moving of atoms located in reservoir traps that are closest to unloaded target traps.

In FIG. 1A, the atoms in a traps array are rearranged using a sequence of moves calculated with the shortest-moves-first algorithm. In this traps array, the positions of the reservoir traps and the allowed paths are determined using a description of the target array as a Bravais lattice.

The sequence 110 in FIG. 1A illustrates the principle of the method in a very simple example of a traps array 112 having a square geometry and comprising 4 target traps (101, 102, 103, 104) forming a square target traps array 111, the target traps array being completed with 5 reservoir traps to form the traps array 112. The traps array 112 is first loaded 11 using a standard method resulting in loaded target traps 104, 103 and loaded reservoir traps 106, 109. Allowed paths between the traps, i.e. paths on which atoms can be moved from one optical trap to another optical trap with a moving tweezers are represented with dotted lines on diagram 11. The goal of the rearrangement is to move the atoms from the loaded reservoir traps (106, 109) to the unloaded target traps (101, 102).

According to the "shortest-moves-first" algorithm, a sequence of moves is calculated that prioritizes the moving of atoms located in reservoir traps that are closest to target traps. In this example, an atom is first moved from the loaded reservoir trap 109 to the unloaded target trap 102 (Move 1, shown in diagram 12). Then, one should expect the remaining unloaded target trap 101 to be loaded with the atom that is in the remaining loaded reservoir trap 106. The shortest move in this example would be moving the atom from reservoir trap 106 to reservoir trap 105, then from reservoir trap 105 to the target trap 104, then from the target trap 104 to the target trap 101. However, as it appears in this example, the target trap 104 is already loaded. Moving an atom through an optical trap that is already loaded with another atom should be avoided as it generally leads to the loss of the two atoms from the trap. This situation is referred to as a "collision" between an atom being moved and the atom in the loaded trap, said atom in the loaded trap being referred to as an obstructing atom.

As illustrated in FIG. 1A, an additional move, also called "anti-collision move" (shown in diagram 13) is required to first move the obstructing atom out of the path (from target trap 104 to target trap 101), before the atom in the loaded reservoir trap 106 may finally be moved to target trap 104 via target trap 105 (diagram 14).

Sequence 120 of FIG. 1A illustrates a more complex example of a traps array 122 having a square geometry and comprising $20^2$ traps (among which 196 target traps and 204 reservoir traps). The 196 target traps form a target traps array 121 that is located in the center of the traps array 122 and is surrounded by the reservoir traps. In an initial step, the trap array 122 is loaded using a standard method. The sequence 120 (comprising diagrams 21, 22, 23, 24) illustrates, respectively, the repartition of the atoms in the traps array in the initial step, after Move 82, after Move 197 and after Move 444, when the rearrangement is completed.

As it appears in FIG. 1A, applying the "shortest-moves-first" algorithm as described previously, results in first filling the target traps in the outer layers of the target traps array and then filling the target traps in the inner layers of the target traps array. This leads to the presence of a large number of obstructing atoms, arranged in a shape of a shell (diagram 23). A large number of additional moves is therefore required to first move the obstructing atoms and avoid collisions. In the second example 120 of FIG. 1A, 247 moves are therefore used to arrange only 27 atoms in 27 unloaded target traps (from Move 197 to Move 444).

FIG. 1B illustrates the number of moves ($N_{mv}$) required for rearranging atoms in a square traps array as a function of the number of target traps (N) in the target traps array, when using the shortest-moves-first algorithm. As shown in FIG. 1B, the line 131 representing the number of moves $N_{mv}$ increases faster than the number of target traps N. This is a limitation for the rearrangement of large traps arrays as the lifetime of an atom in an optical trap is limited (typically about 20 seconds). It is therefore advantageous to complete the sequence of moves in a time typically inferior to the lifetime of the N atoms in the N optical traps (typically equal to 20/N seconds) and thus to limit the number of moves.

Therefore, there is a need for a method for arranging atoms in a target traps array that would adapt to any type of arrays and that would scale better to a large number of target traps.

SUMMARY

In what follows, the term "comprise" is synonym of (means the same as) "include" and "contains", is inclusive and open, and does not exclude other non-recited elements. Moreover, in the present disclosure, when referring to a numerical value, the terms "about" and "substantially" are synonyms of (mean the same as) a range comprised between 80% and 120%, preferably between 90% and 110%, of the numerical value.

According to a first aspect, the present disclosure relates to a method for arranging atoms in a target array of optical traps with predefined positions comprising:

- generating a given number of target traps at said predefined positions;
- generating reservoir traps, said reservoir traps and said target traps forming a traps array;
- defining allowed paths between traps of the traps array;
- loading atoms in the traps array to generate an initial loaded traps array;
- determining the positions of the atoms in the initial loaded traps array;
- calculating a sequence of moves using a rearrangement algorithm based on said initial loaded traps array and said allowed paths; and
- applying the sequence of moves to rearrange the atoms in the traps array and form a final loaded traps array.

The applicant has shown that such a method can be used to arrange atoms in an array of target optical traps with any type of arrangement (also called geometry in the present description) of said target optical traps. Reservoir traps are generated and allowed paths are defined based on the geometry of the target array. The traps array is then loaded with atoms and the atoms are rearranged using a sequence of moves calculated with a rearrangement algorithm.

In the present description, the positions of the reservoir traps and the target traps, as well as the positions of the atoms and the allowed paths are directly used as inputs in the rearrangement algorithm to generate a fully loaded target traps array.

In the present description, an optical trap loaded with an atom is referred to as a loaded optical trap and an optical trap devoid of any atom is referred to as an unloaded optical trap.

In the present description, determining the configuration of a loaded traps array means determining the positions of the traps of the traps array that are loaded with an atom and the positions of the traps that are left unloaded.

In the present description, a unit allowed path is a straight line between two adjacent optical traps that does not cross any other unit allowed path nor any other trap than said two adjacent traps. It is possible to move an atom between optical traps that are separated by a unit allowed path, for example using moving tweezers. Depending on the geometry of the traps array, the unit path can have a homogeneous length over the traps array or an inhomogeneous length over the traps array.

When moving an atom between two optical traps that are not separated by a single unit allowed path, the atom is moved via an allowed path that passes by several intermediate optical traps and that comprises several unit allowed paths. Therefore, in the present description, an allowed path is a path along which an atom can be moved from an optical trap to another optical trap wherein the path comprises one or more unit allowed paths.

According to one or further embodiments, the method according to the present description further comprises generating reservoir traps comprises computing a Voronoi diagram of the target traps to define Voronoi cells; each reservoir trap being generated in a Voronoi cell. According to one or further embodiments, each reservoir trap is located at a distance that is larger than a safety distance from all other traps.

The safety distance is a minimal geometrical distance between two optical traps ensuring that an atom loaded in one of said optical traps will not be affected by the other of said optical traps. The safety distance depends, for example, on the size of the optical traps. In general, the safety distance can vary from approximately 3 micrometers to approximately 5 micrometers, and is preferably equal to approximately 4 micrometers.

The applicant has shown that such embodiment enables to generate reservoir traps in any arrangement of target traps. As a matter of fact, in methods of the prior art, traps arrays generally have a simple geometry and can be described by a simple Bravais lattice, for example a square lattice wherein the vertices are the optical traps. The positions of the reservoir traps are generally directly derived from an extension of this lattice around the target array. The allowed paths can also be found directly as the edges of the lattice.

However, there are arrays that are useful for applications such as quantum simulation or quantum sensing, but that cannot be described by a Bravais lattice. These arrays can be, for example, non-periodic structures ranging from crystals with defects (interstitial defects, vacancies, dislocations, grain boundaries), to quasi-crystals, to disordered arrays for Anderson or many-body localization studies, all the way up to totally random structures in the context of combinatorial optimization problems such as finding the maximum independent set of a graph.

According to one or further embodiments, defining allowed paths between traps of the traps array comprises a Delaunay triangulation. The Delaunay triangulation yields a description of any target array in terms of graph language, connecting the nodes (trap positions) by edges along which the atoms can be moved (allowed paths). Using this graph language many different shortest-path graph algorithms can directly be used (e.g. the Dijkstra algorithm) to find the shortest allowed path between an initial trap and a final trap in order to calculated a sequence of moves to rearrange the atoms in the traps array.

The applicant showed that both the use of Voronoi diagrams to generate reservoir traps and of Delaunay triangulation to define the allowed paths are suitable for target arrays with any type of geometry, including irregular geometries that cannot be described using a Bravais lattice. This allows any target array to be adapted for the implementation of a rearrangement algorithm, including all the rearrangement algorithms that proved efficient in the case of Bravais lattices.

According to one or further embodiments, determining the positions of the atoms in the initial loaded traps array comprises acquiring an initial fluorescence image of the initial loaded traps array.

According to one or further embodiments, said algorithm is a compression algorithm and comprises:

- electing a first target trap among the target traps;
- defining a first layer that is nearby to the first target trap using the allowed paths;
- defining candidate traps in the first layer, said candidate traps being chosen among the optical traps of the first layer that are loaded with an atom;
- defining a first move of an atom from one of the candidate traps to the first target trap;
- an iterative procedure comprising:
  - defining a layer to load, said layer to load being an incomplete layer that is nearby to the first target trap or to a layer that has been fully loaded with at least one of the preceding moves;
  - defining a candidate layer, said candidate layer being a layer that is nearby to the layer to load and has not been loaded with any of the preceding moves;
  - defining subsequent moves of atoms from the candidate layer to the traps of the layer to load that are not loaded with an atom until every unloaded trap of the layer to load is loaded with an atom; and
- repeating the iterative procedure until all the target traps of the traps array are loaded with an atom.

In the present description, a layer of optical traps is an ensemble comprising a plurality of optical traps.

In the present description, a layer is nearby to a predetermined optical trap if any optical trap of the layer is separated from the predetermined optical trap by at least one allowed path comprising only one unit allowed path.

In the present description, a first and a second layers are nearby if any optical trap of the first layer is separated by a single unit allowed path from at least one optical trap of the second layer and if any optical trap of the second layer is separated by a single unit allowed path from at least one optical trap of the first layer.

In the present description, a layer of optical traps comprising only loaded optical traps is referred to as a fully loaded layer and a layer comprising at least one unloaded optical trap is referred to as an incomplete layer.

In the present description, loading a layer is a synonym to loading at least one of the optical traps of the layer.

The inventors have shown that, in the compression algorithm, the atoms are always moved from one layer to a nearby layer so that each atom is moved at most once during the rearrangement. This allows the number of moves to be reduced compared to algorithms of the prior art. In particular, with the compression algorithm, the number of moves is kept always inferior or equal to the number of target traps and scales approximately linearly with the number of target traps. This makes the loading of atoms in a target array with large number of target traps more feasible, with a larger probability that all the atoms in the target traps remain steady in their traps.

Moreover, the inventors have shown that the method according to the first aspect is especially suitable for arranging atoms in a target traps array that is compact. The compression algorithm avoids the formation of a shell of obstructing atoms causing collisions as is the case with the shortest-moves-first algorithm.

According to one or further embodiments, said algorithm is a split-merge algorithm and comprises:

- calculating, using a minimization of a cost function with a linear sum assignment solver, a preliminary sequence of moves to move atoms from reservoir traps of the traps array to target traps, each move being done on at least one of the allowed paths; wherein said cost function comprises a sum of the distances of the moves used to move atoms along allowed paths;
- determining collisions among the preliminary sequence of moves, said collisions comprising the moving of an atom through an optical trap that is loaded with an atom;
- splitting moves comprising collisions into at least two sub-moves to form a new sequence of moves that does not comprise collisions;
- merging sub-moves that have the same trap as an initial trap and a final trap to form the modified sequence of moves.

In the present description, the distance of a move (also referred to as the travel distance of a move) is a geometric distance calculated on the allowed path along which an atom is moved during said move.

The applicant has shown that the split-merge algorithm is particularly adapted to the rearrangement of atoms in target array that are not compact, for example an array with a random distribution of the positions of the target traps or with a checkerboard distribution.

The applicant has shown that the split-merge algorithm generally yields a sequence of moves with fewer moves than algorithms of the prior art, especially when the number of target traps becomes large, for example larger than about 100 target traps. In particular, the applicant has observed that the number of moves is only about 20% to 30% superior to half of the number of target traps (which is the minimum number of moves possible).

According to one or further embodiments, said algorithm is a reordering algorithm and comprises:

- calculating, using a minimization of a cost function with a linear sum assignment solver, a preliminary sequence of moves to move atoms from reservoir traps of the traps array to target traps, each move being done on at least one of the allowed paths; wherein said cost function comprises a sum of the squared distances of the moves used to move atoms along allowed paths;
- reordering the preliminary sequence of moves to postpone the moves comprising collisions in order to form the modified sequence of moves.

The applicant observed that the reordering algorithm always yields a sequence of moves that does not comprise collisions and therefore does not require any additional moves to avoid the collisions. Therefore, the reordering algorithm is particularly adapted to the rearrangement of atoms in target arrays that are compact, for example an array with a tight square lattice of atoms.

In particular, the applicant has shown that, in the case of compact target arrays, the reordering algorithm advantageously takes a smaller computation time than other rearrangement algorithms when the number of target traps is inferior to a threshold value, for example inferior to about 300 target traps.

According to one or further embodiments, the method further comprises:

- determining the positions of the atoms in the final loaded traps array;
- determining a number of defects in the final loaded target traps array.

Advantageously, the number of defects can be used to determine if an experiment can be successfully implemented with the fully-loaded target traps array or if a new loading or a new rearrangement is preferable.

According to one or further embodiments, determining the positions of the atoms in the final loaded traps array comprises acquiring a final fluorescence image of the final loaded target traps array.

According to one or further embodiments, the method further comprises, if the number of defects is non-zero, rearranging again atoms in the loaded traps array using a new sequence of moves calculated with said algorithm.

According to one or further embodiments, said rearrangement of atoms in the loaded traps array is repeated a plurality of times in order to obtain a fully-loaded target traps array. The additional rearrangement iterations are referred to as multiple rearrangement cycles in the present description.

According to one or further embodiments, a fluorescence image is acquired after each rearrangement in order to determine the new number of defects.

The applicant has shown that using multiple rearrangement cycles increases the probability to obtain a perfect fully-loaded traps array without any defects that can be directly used to implement experiments, for example experiments such as quantum simulation of quantum sensing.

According to a second aspect, the present disclosure relates to a quantum processing system comprising:

- an optical set-up configured to generate single laser-cooled atoms trapped in an array of optical traps, wherein said array comprises targets traps whose positions are predefined by a user and that form a target traps array, and reservoir traps;
- means for moving said atoms in said optical traps array;
- a control unit configured to arrange said atoms in the optical traps array using said means, wherein the control unit is configured to implement a method according to one of the preceding claims in order to obtain a fully loaded target traps array.

According to one or further embodiments, the positions of the optical traps are defined with a spatial light modulator. This allows the user to select precisely the geometry of the target array in order to adapt it to a particular experiment.

According to one or further embodiments, the means for moving said atoms in said optical traps array comprise an acousto-optic deflector. Such acousto-optic deflector is suitable for a fast moving of atoms and allows for changing the intensity of the moving tweezers.

BRIEF DESCRIPTION OF DRAWINGS

Other advantages and features of the invention will become apparent on reading the description, illustrated by the following figures which represent.

DETAILED DESCRIPTION

Figure 2A:
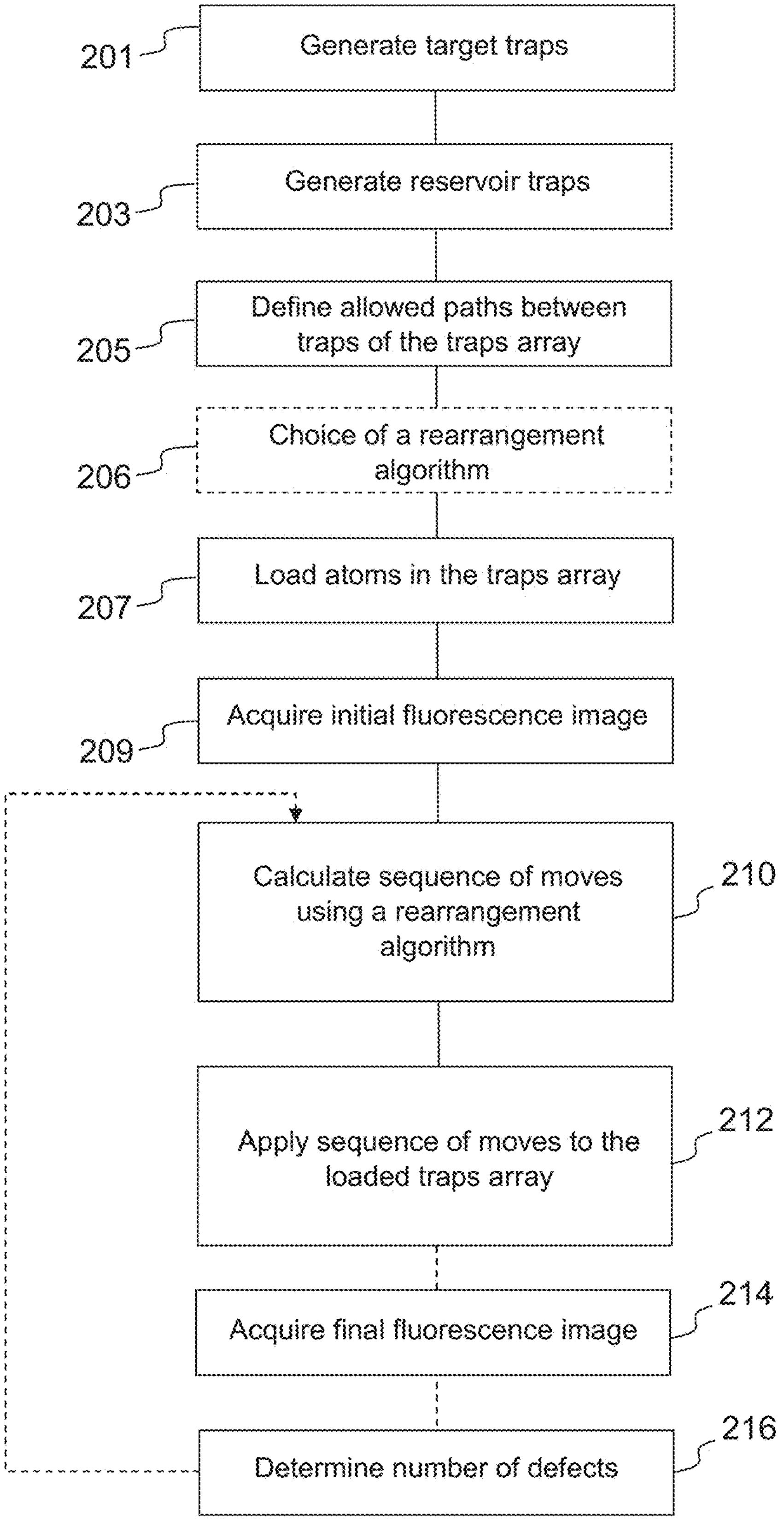
FIG. 2A, a block diagram illustrating a method for arranging atoms in an array of optical traps, according to embodiments of the present description.

FIG. 2 is a block diagram illustrating a method for arranging atoms in an array of optical traps, according to embodiments of the present description.

A goal of the method 200 is to obtain a fully-loaded array of optical target traps at predefined positions. The method generally comprises several steps comprising generating reservoir traps, loading atoms in the traps array made of the target traps and reservoir traps, and rearranging the atoms in the loaded traps array. The method can be implemented using different types of arrangement algorithms, including specific algorithms that will described in the following.

In a first step 201 of the method, N target traps are generated at predefined positions, forming a target traps array. The positions may be chosen by a user so that the array has a simple geometry, such as a square array, a triangular array or another type of Bravais lattice, they can also be chosen so that the array has a more complex geometry, for example an irregular lattice that cannot be described by a Bravais lattice. In particular, the positions may be chosen so that the target traps form an array with a completely arbitrary geometry, for example a simplified version of a drawing.

Generally, the number of target traps N may be comprised between about 50 and about 500.

In a second step 203, reservoir traps are generated in addition to the target traps to form a traps array. The reservoir generation according to the present description will be described later. The reservoir traps according to the present description are used to facilitate the rearrangement of atoms in the optical traps and compensate for the fact that the loading of atoms in the traps is stochastic.

The number of reservoir traps can depend for example on the number of target traps, and the complexity of the geometry of the traps array. The number of reservoir traps can be, for example, approximately equal to the number of target traps, thus forming a traps array comprising a number of optical traps approximately equal to 2*N. Such number compensates the fact that the loading is statistically efficient at 50%. Therefore, having 2*N optical traps yield an average of N atoms in N loaded traps after the loading.

Figure 4:
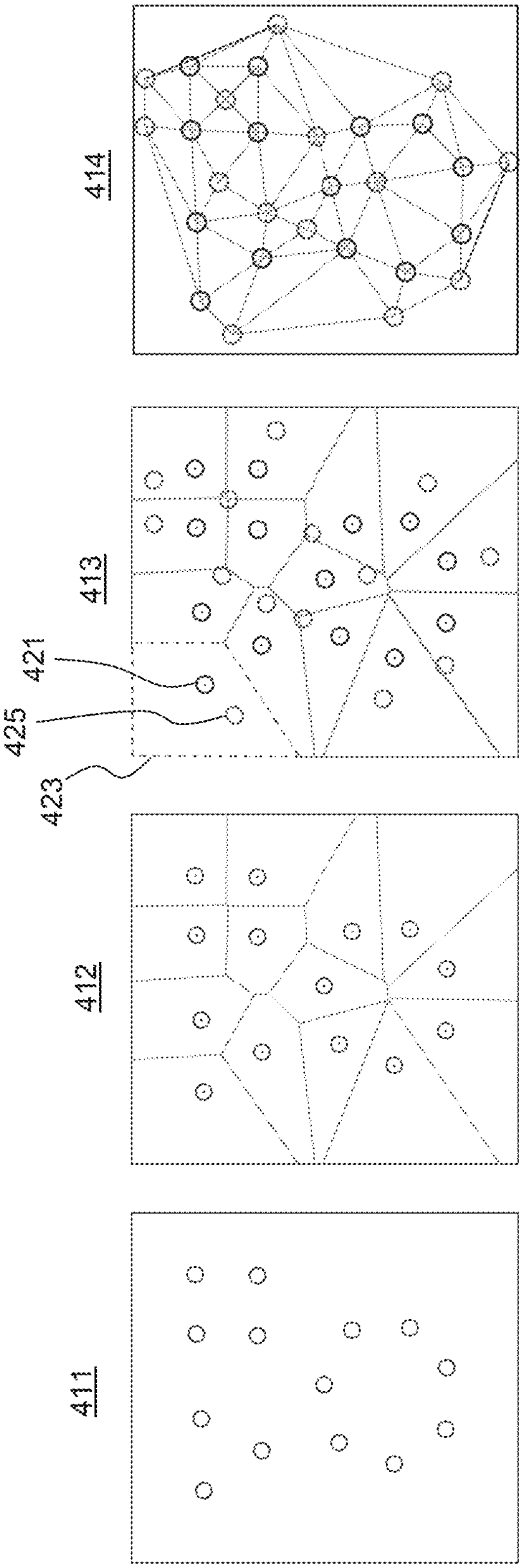
FIG. 4, a series of diagrams illustrating the generation of reservoir traps and the determination of allowed paths according to the present description.

In a step 205, allowed paths are determined between traps of the traps array. The determination of the allowed paths is represented in FIG. 4, which will be described later. The allowed paths are the paths along which an atom can be moved between two traps of the traps array.

In a step 207, atoms are loaded in the trap array. The loading is for example stochastic, half of the traps of the traps array being loaded and half of the traps of the traps array being left empty, in average.

The loading of atoms can be implemented in different ways. For example, the traps can be loaded with single Rubidium ($^{87}Rb$) atoms at a temperature equal to about 10 μK, from a magneto-optical trap. The time to load the atoms (loading time) is comprised between about 50 ms and about 300 ms, for example 150 ms.

Other types of atoms may be used, especially atoms that can be cooled using laser cooling.

After the loading, an initial fluorescence image may be acquired (step 209) in a certain observation time (for example 20 ms) in order to determine the initial configuration of the traps array, i.e. which traps of the traps array are loaded with an atom. It is also possible to determine the occupancy of the target array, i.e. the proportion of the optical traps of the traps array that are loaded with an atom. The occupancy can be in general between approximately 50% and approximately 60%.

Once the initial configuration of the traps array is determined, a rearrangement algorithm is used to rearrange the atoms of the traps array in order to form a fully-loaded target traps array. As the occupancy is generally superior to 50%, a number of reservoir traps equal to about the number of target traps is sufficient to obtain a fully loaded target traps array after rearrangement.

Rearranging the atoms in the traps array thus comprises two steps:

calculating 210 a sequence of moves to rearrange the atoms using the rearrangement algorithm, and applying 212 the sequence of moves to the initial loaded traps array in order to rearrange the atoms in the target traps.

The inputs of the rearrangement algorithm comprise the positions of the target traps in the traps array, the initial configuration of atoms in the traps array and the allowed paths.

The outputs of the rearrangement algorithm comprise a sequence of moves to move the atoms of the traps array in order to form a fully-loaded target traps array.

Different algorithms can be used such as the "shortest moves first" algorithm described in D. Barredo, S. de Léséleuc, V. Lienhard, T. Lahaye, and A. Browaeys, *An atom-by-atom assembler of defect-free arbitrary 2d atomic arrays, Science* 354, 1021 (2016).

The applicant has shown that other types of algorithm can advantageously be used, for example a compression algorithm, a split-merge algorithm and a reordering algorithm, which will be described later.

After the sequence of moves is calculated 210 with a rearrangement algorithm, the sequence of moves is applied to the initial loaded traps array in a step 212, also called assembly in the present description. During the assembly, atoms are transported one by one from an initial trap to one of the target traps using moving tweezers, until the target array is fully filled.

During the assembly step 212, the moving tweezers can be, for example, a single 850 nm dipole trap with a $1/e^2$-radius comprised ranging from about 1 micrometer to about 3 micrometer, steered by a two-dimensional acousto-optic deflector, which can pick-up an atom from a loaded trap by ramping up its depth to approximately 10 mK, subsequently moving and then releasing it at the position of an unloaded trap.

After the assembly step 212, a final fluorescence image is acquired 214 with an exposure time of about 20 ms in order to determine the final configuration of the rearranged traps array.

During step 216, a number of defects is determined from the final fluorescence image. The defects are the target traps that are unloaded after the assembly step 212.

If the number of defects is zero, the final configuration is generally validated and experiments can be performed with the loaded traps array, for example quantum simulation experiment. The method according to the present description allows the applicant to perform experiments with a typical repetition rate of approximately 3 Hz that is suitable for quantum experiments.

If the number of defects is non-zero, steps 210, 212, 214, 216 are repeated at least a second time until a defect-free array is obtained, also called "fully-loaded" target traps array.

The repetition of the rearrangement implemented with steps 210, 212, 214 and 216 is referred to as multiple rearrangement cycles in the present description.

However, this procedure requires more than N initial atoms, a high efficiency of a single rearrangement cycle is essential as laser power is a limiting factor for scaling up the number of atoms.

To maximize the success probability of the assembly 212 process, it is preferable to minimize the total assembly time. A first reason for that arises from the vacuum-limited lifetime $\tau_{vac}$ of a trapped atom, which is generally equal to approximately 20 s. This means that for a traps array with N atoms, the lifetime of the configuration is $\tau_{vac}/N$. It is thus important, when N increases, to minimize the total assembly time to reduce atom losses during assembly.

As atoms are moved between traps at a constant velocity (typically about 100 nm/μs, meaning we need about 50 μs to move over a typical nearest-neighbor distance of about 5 μm), and as it requires a comparatively longer time (approximately 600 μs) to capture or release an atom, minimizing the assembly time mainly amounts to minimizing the number of moves (and, but to a lesser extent, the total travel distance).

A second reason for minimizing the number of moves is that each transfer from a source trap to a target trap has a finite success probability p (typically around p~0:98 in our experiments), partly due to vacuum-limited losses, but also due to, e.g. inaccuracy in the positioning of the moving tweezers, or residual heating. Beyond the number of moves or the total travel distance, the time it takes for the algorithm to compute the moves at each repetition of the experiment also contributes to the total assembly time.

For successful assembly of a given target array, in addition to minimizing the number of moves, it is also of paramount importance that all traps have a good optical quality, and in particular the same depth such that:

(i) single-atom loading does indeed occur with a probability approximately equal to 0.5; and, (ii) the fluorescence signal from any given trap allows for efficient identification of the presence of a single atom.

This can be ensured by using, for example, a trap-intensity equalization scheme to improve iteratively the SLM phase patterns (using a CCD camera to record the trap intensity); or a direct optimization of the fluorescence time trace of each single trap, altering the trap intensity until we fulfill criteria (i) and (ii).

Figure 2B:
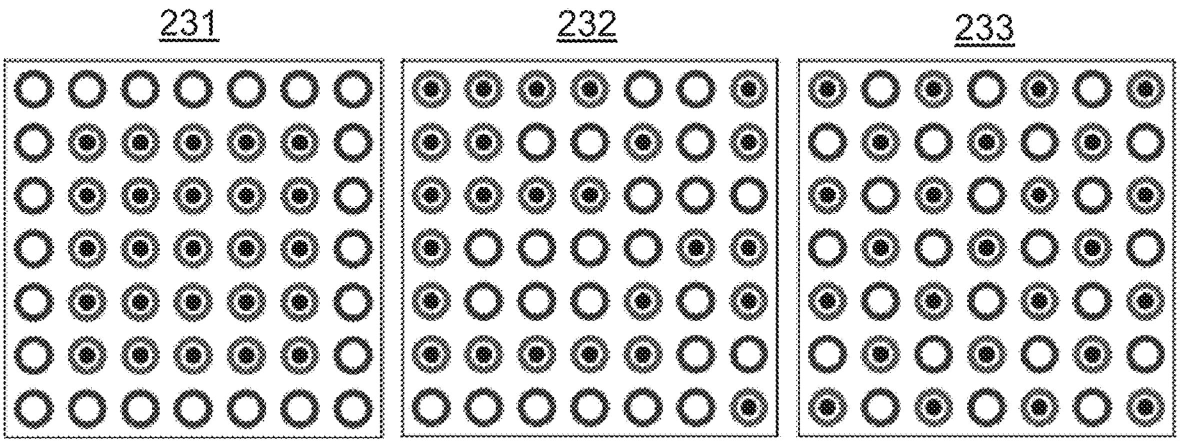
FIG. 2B, a series of diagrams illustrating traps arrays with different geometries, according to embodiments of the present description.

FIG. 2B shows three diagrams illustrating target arrays with different geometries, the target traps are represented by filled circles and the reservoir traps are represented by empty circles. Diagram 231 represents a target array with a compact arrangement. Diagram 232 represents a target array with a sparse arrangement obtained by a random process (a random calculation of the positions of the target traps usually provide a sparse array), it is a non-compact arrangement. Diagram 233 represents a target array with a "checkerboard" arrangement, it is a non-compact arrangement.

Although the type of arrangement or geometry can be used to define a target array, it is generally determined after the reservoir traps have been generated. Therefore, the type of arrangement is also a property of the traps array comprising the target array and the reservoir traps.

Figure 2C:
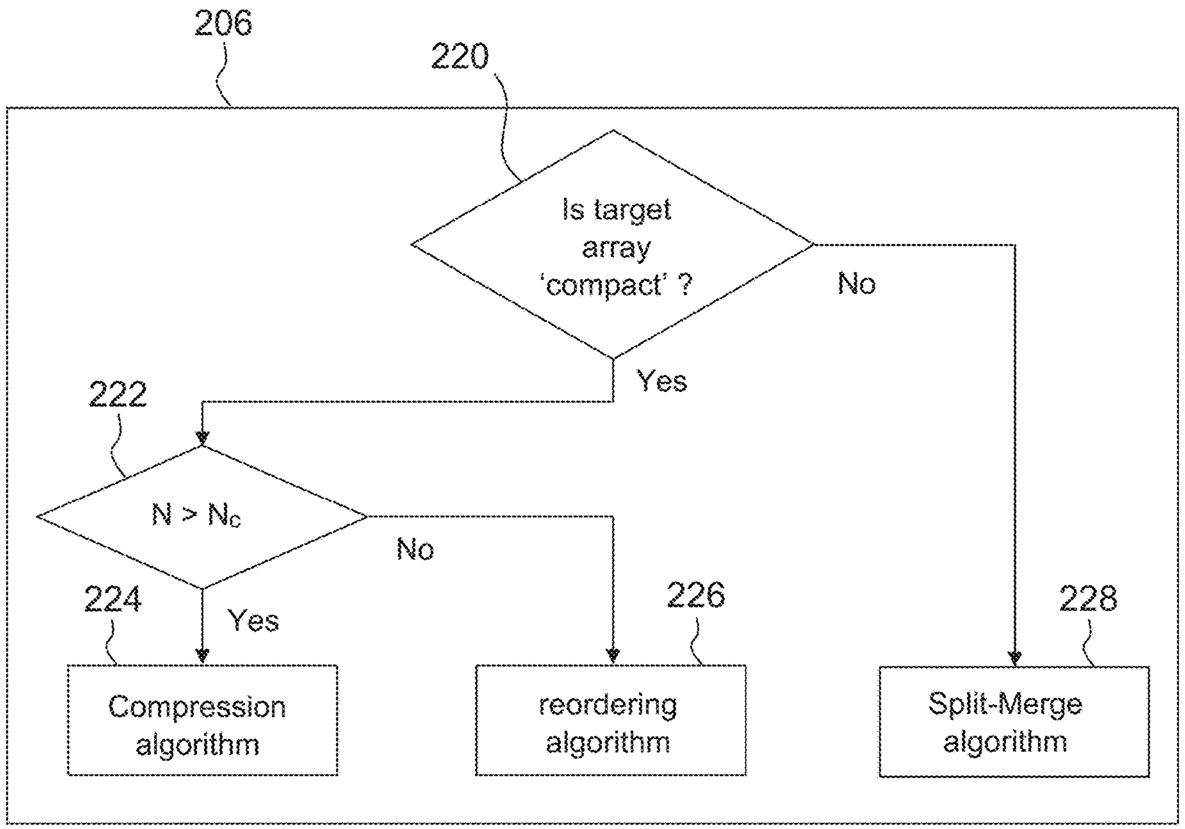
FIG. 2C, a block diagram illustrating the choice of a rearrangement algorithm in a method for arranging atoms in an array of optical traps, according to embodiments of the present description.

FIG. 2C is a diagram illustrating the choice 206 of a rearrangement algorithm based on characteristics of the target traps array.

The applicant has shown that it can be advantageous to choose a rearrangement algorithm based on the characteristics of the traps array (for example the compactness of the target array and the number of target traps) in order to adapt the algorithm to the traps array and minimize the assembly time.

A first test 220 can be implemented to determine whether the target traps array is compact or not compact. In the present description, a target traps array is compact if the convex envelope of the target traps array does not comprise any reservoir traps. Conversely, a target traps array is not compact if the convex envelope comprises at least one reservoir trap.

If the target array is not compact, the split-merge algorithm 228 can be advantageously chosen to rearrange the atoms.

If the target array is compact, a second test 222 can be implemented to determine whether the number of target traps is inferior, superior or equal to a predetermined threshold number, $N_c$.

If the number of target traps is superior to $N_c$, the compression algorithm 224 can be advantageously chosen to rearrange the atoms.

If the number of target traps is inferior to $N_c$, the reordering algorithm 226 can be advantageously chosen to rearrange the atoms.

If the number of target traps is equal to $N_e$ the compression algorithm 224 or the reordering algorithm 226 can be chosen equivalently.

Figure 5A:
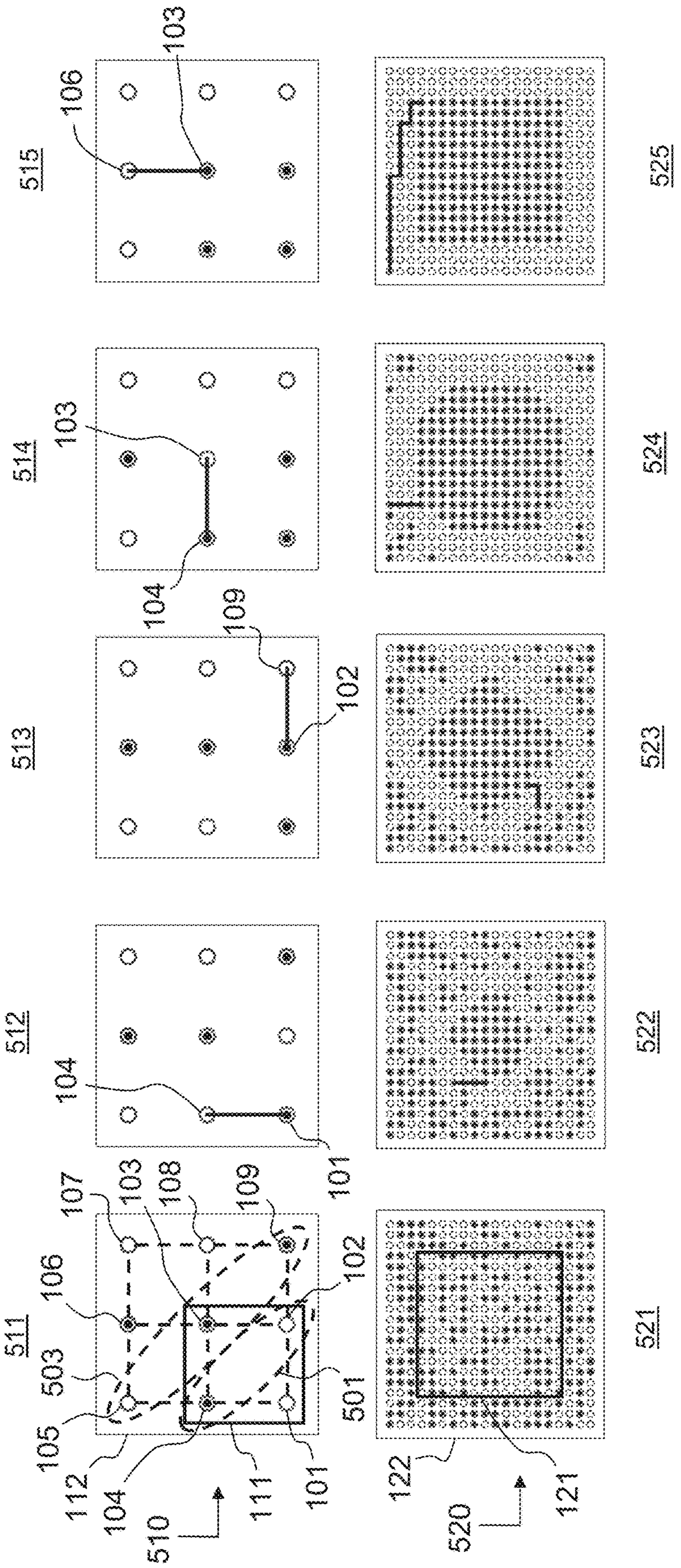
FIG. 5A, series of diagrams illustrating examples of a rearrangement of atoms in an array of optical traps, according to embodiments of the present description.
Figure 5B:
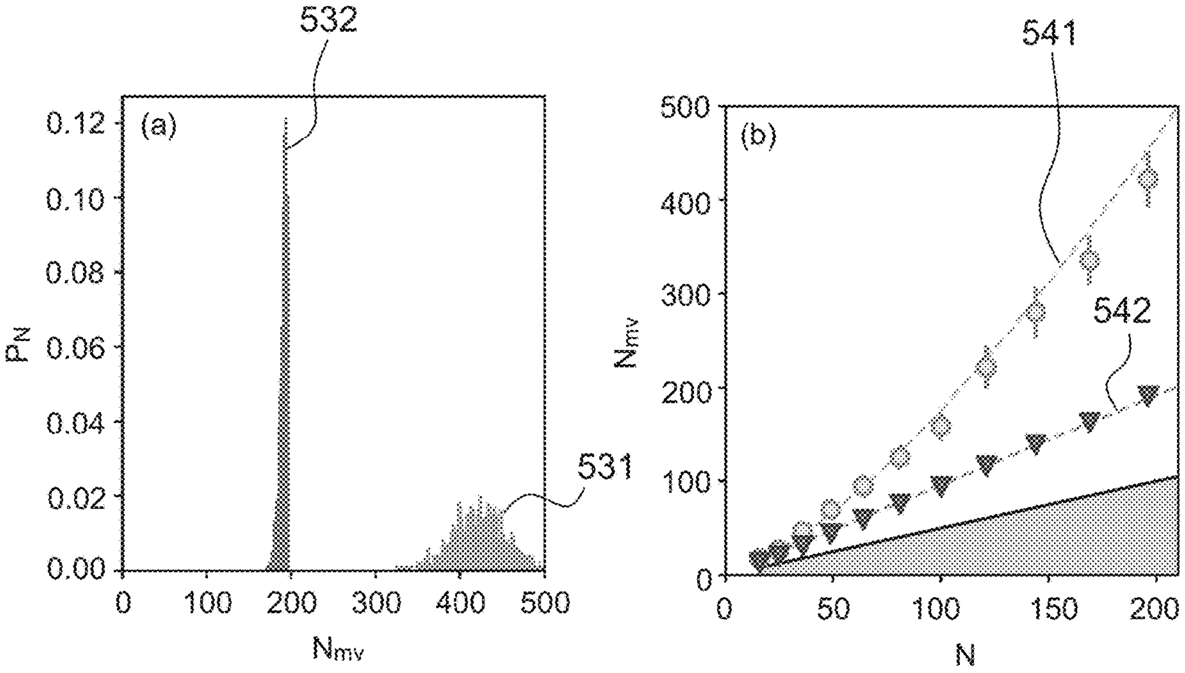
FIG. 5B, two graphs illustrating a comparison between the efficiency of a method according to embodiments of the present description and a method according to the prior art.
Figure 6:
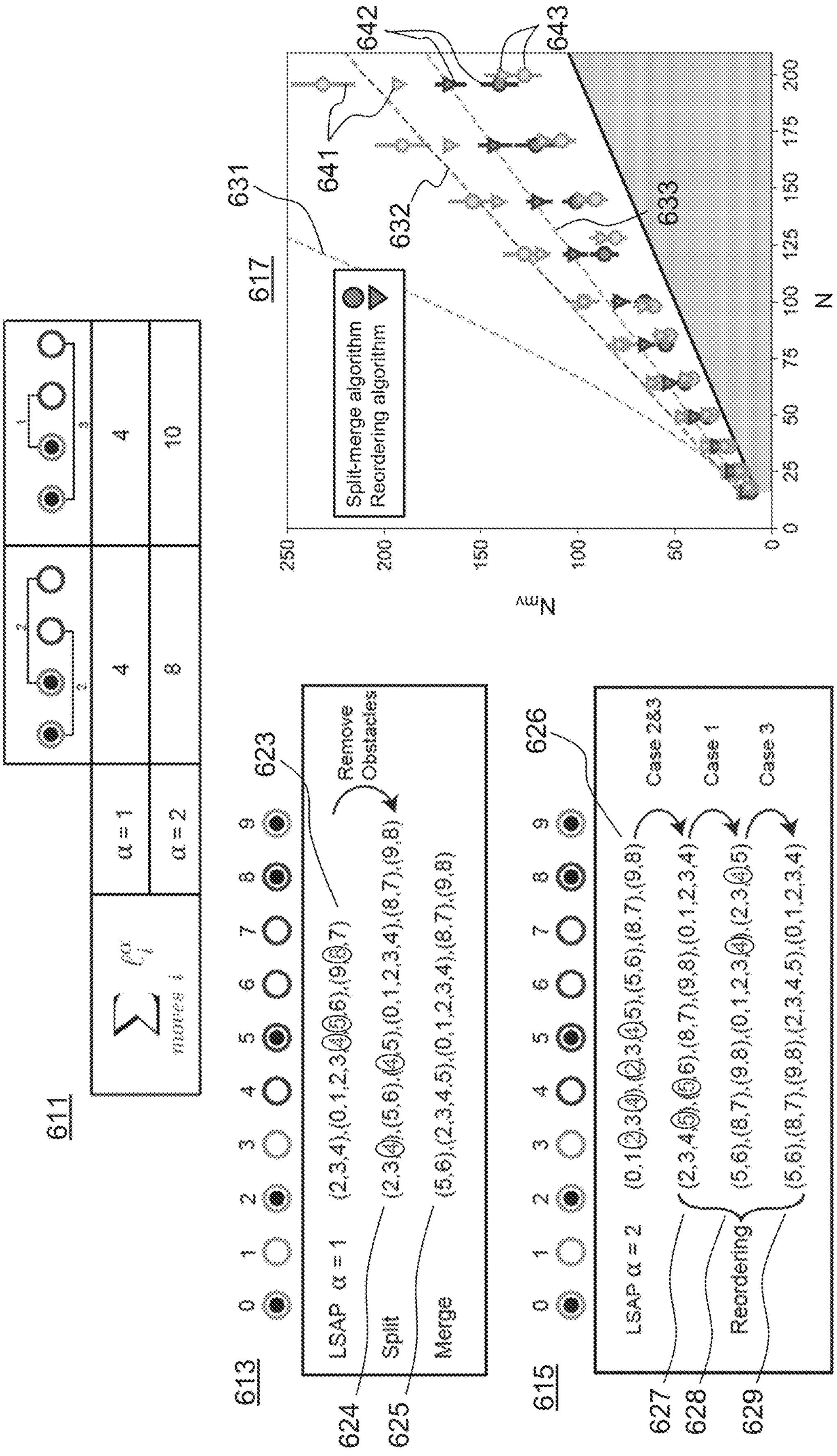
FIG. 6, a diagram illustrating alternative algorithms for rearranging atoms in an array of optical traps according to embodiments of the present description.

The algorithms 224, 226, 228 will be introduced in further details with the description of FIGS. 5-6.

Although the algorithms 224, 226, 228 can be used advantageously in the specific cases illustrated in FIG. 2C, they can generally be used to arrange atoms in arrays with different geometries.

Figure 3:
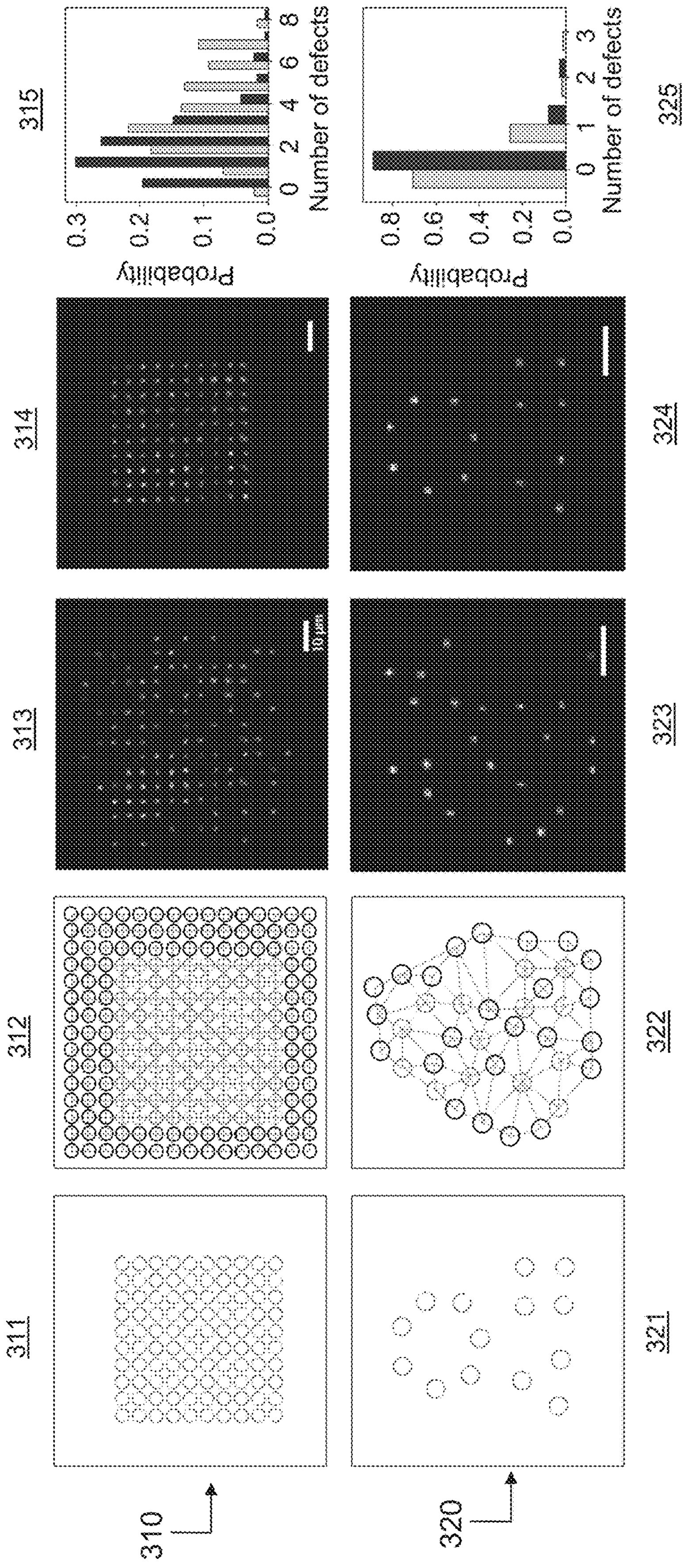
FIG. 3, series of diagrams further illustrating a method for arranging atoms in an array of optical traps according to embodiments of the present description.

FIG. 3 is a series of diagrams further illustrating a method for arranging atoms in an array of optical traps according to embodiments of the present description;

The series 310 illustrates the arrangement of atoms in a target array that is compact and has a simple geometry (a square), and the series 320 illustrates the arrangement of atoms in a target array that is not compact and that has an arbitrary geometry.

In series 310 and 320:

311, 321 is a diagram illustrating a target array.

312, 322 is a diagram illustrating the traps array comprising the target array and reservoir traps generated using the method according to the present description.

313, 323 is an initial fluorescence image showing the initial configuration of the traps array after the loading of the atoms.

314, 324 is a final fluorescence image showing the final configuration of the traps array after the rearrangement of the atoms using a rearrangement algorithm. In this example the configurations do not comprise any defects.

315, 325 is a diagram illustrating the probability distribution of the number of defects (missing atoms) after a (single) rearrangement.

In the example illustrated in the series 310, the target array is compact, therefore the compression algorithm is advantageously used to rearrange the atoms.

In the example illustrated in the series 320, the target is not compact and the number of target traps is inferior to 300, therefore the split-merge algorithm is advantageously used to rearrange the atoms, in agreement with FIG. 2B.

FIG. 4 represents a series of diagram illustrating, in more details, the generation 203 of reservoir traps and the determination 205 of allowed paths in a method according to the present description.

Diagram 411 shows the target traps array.

Diagram 412 shows the division of the target traps array into Voronoi cells.

Diagram 413 shows the placing of reservoir traps in Voronoi cells.

Diagram 414 shows the determination of allowed path between traps of the traps array.

In the method according to the present description, the target traps array is adapted to a rearrangement process by generating reservoir traps and determining allowed paths. The method according to the present description can be applied to target arrays with any geometry.

In methods of the prior art, the generation of reservoir traps and the definition of allowed paths are generally based on an underlying lattice (also used in condensed-matter models to study specific crystalline arrangements which are described by a Bravais lattice, e.g. a square or a triangular lattice).

The use of such a lattice simplifies the problem in two ways. First, this naturally defines the allowed paths along which the moving tweezers can travel as the edges of the lattice. Because these edges are separated by a constant spacing, it automatically ensures that a minimal distance between atoms is always kept during the rearrangement and no other atom is disturbed by the moving tweezers when it is moving an atom. Second, it simplifies the distance calculation between two traps by defining the metric in terms of lattice coordinates (Manhattan distance).

However, not all target traps array geometry can be described by such a lattice. In particular, there are arrays of interest for quantum simulation that are non-periodic and therefore cannot be described by a Bravais lattice. For such arrays, the applicant developed a pre-adaptation method which is not based on an underlying Bravais lattice and, therefore is suitable for arranging atoms in any target traps array, whatever its geometry.

First, N additional reservoir traps are placed close to a set of N target traps whose positions are provided by the user.

Whenever possible, to reduce the number of moves during the rearrangement, a reservoir trap should be placed in immediate proximity of each target trap. To do so, we compute the Voronoi diagram 412 (see F. P. Preparata and M. Shamos, *Computational Geometry: An Introduction, Springer-Verlag*, New York, 1985, p. 85) of the set of target traps. We divide the plane formed by the target traps array into N cells 423, one for each target trap 421, such that every point in this cell 423 is closer to the target trap 421 of the cell than to any other trap).

We then add in each Voronoi cell 423 a single reservoir trap 425, provided that it can be placed at a distance larger than a "safety" distance $d_m$ (typically equal to approximately 4 μm) from all other traps. The safety distance is a minimal geometrical distance between two optical traps ensuring that an atom loaded in one of said optical traps will not be affected by the other of said optical traps.

However, it the density of the target trap is already comparable to $$1/d_m^2,$$

we cannot add enough reservoir traps in this way, and thus we place extra traps at the periphery of the pattern in a compact triangular array.

The next step is to find allowed paths along which an atom can travel to an empty target trap. Contrary to the case of Bravais lattices, no obvious edges are a priori connecting the traps along which the moves can be performed. Direct, straight-line paths from reservoir to target trap are not always possible, since there can be other traps in the way, possibly leading to collisions and atom losses. Thus, a set of allowed paths is defined by using a Delaunay triangulation (see F. P. Preparata and M. Shamos, *Computational Geometry: An Introduction, Springer-Verlag*, New York, 1985, p. 209-210) of the full set of traps (target traps and reservoir traps), which naturally generates triangles that are not too "flat". In practice, the triangulation may be implemented with the Python 3.0 software, using the Scipy library.

To enforce a constraint of a minimal safety distance between the path of an atom and other traps, few paths can be removed at the periphery of the array (see dashed lines in FIG. 4, diagram 414).

Advantageously, the generation of the reservoir traps and of the determination of the allowed paths can be done only once for any given target array and not at each repetition of the experiment, which considerably relaxes the constraints on the speed of the method according to the present description. In practice, arrays with hundreds of target traps can be processed in a few seconds.

The triangulation according to the present description allows a description of any target array in terms of graph language, connecting the nodes (trap positions) by edges (allowed paths) along which the atoms are allowed to move. In this way, the necessity to describe the problem with an underlying Bravais lattice, as in the prior art, is eliminated.

Further, the triangulation is adapted to the use of efficient shortest-path graph algorithms (e.g. the Dijkstra algorithm) to find the shortest path between an initial trap and a target trap, following the allowed edges of the graph. For the generation of the graphs and graph-algorithms the Networkx library is used (see A. A. Hagberg, D. A. Schult, and P. J. Swart, *Exploring network structure, dynamics, and function using NetworkX, in in: Proceedings of the 7th Python in Science Conference* (*SciPy*2008), edited by G. Varoquaux, T. Vaught, and J. Millman (2008) pp. 11-15).

With the method according to the present description, it is then possible to implement rearrangement algorithms for any target array, including target arrays with arbitrary geometry. Moreover, the method does not degrade the scaling and performance of the algorithms (in terms of computation time and of number of moves).

The applicant has demonstrated the implementation of several algorithms to calculate the sequence of moves in order to rearrange the atoms of the traps array and obtain a fully-loaded traps array.

FIG. 5A represents two series 510, 520 of diagrams illustrating examples of a rearrangement of atoms in an array of optical traps, according to an embodiment of the present description using the compression algorithm 224.

Series 510 represents a rearrangement of atoms in a traps array 112 comprising a target traps array 111 (with 4 target traps) and 5 reservoir traps. Diagrams 511, 512, 513, 514, 515 represent the configuration of the traps array in the initial stage, after one move, after two moves, after three moves and after four moves, respectively.

Series 520 represents a rearrangement of atoms in a traps array 122 comprising a target traps array 121 (with 182 target traps) and 218 reservoir traps. Diagrams 511, 512, 513, 514, 515 represent the configuration of the traps array in the initial stage, after 43 moves, after 106 moves, after 173 moves and after 195 moves, respectively.

In order to prevent the formation of a shell of loaded traps around unloaded target traps during the rearrangement and have a collision-free rearrangement without any post-processing, it is useful to fill the target traps in a determined order. In the compression algorithm, we first fill the central traps, and progressively, one layer after the other, we fill the compact target array until we reach its border. To fill the traps, we choose the closest atoms lying outside the already assembled structure comprising loaded traps. An asset of this compression approach is that we can calculate once, independently of the initial loading, which atoms can be used to fill a given target trap and store this information in a sequence of moves. This reduces the calculation time on a particular instance, which scales roughly as $N^{1.2}$ with the number of target traps and amounts, in our implementation, to about 7 ms for N=100.

In the example represented by series 510 in FIG. 5A, the target array 111 is first assembled from the trap 101 in the bottom left corner, then the diagonal comprising traps 102, 104, and finally the trap 103 in the top right corner. This sequential filling is done layer by layer, the layers being defined with respect to the first target trap 101. Therefore, the first layer 501 is used to fill the first trap 101, the second layer 503 is used to fill the first layer 501, and so on. If there is no atom left in a layer to fill a trap of another layer, another layer further away from the first trap is used instead.

In the example represented by series 520 in FIG. 5A, the target array 121 is first assembled from a trap near the geometrical centre of the target array 121, then it is assembled layer by layer in a concentric manner, forming a diamond-like structure of loaded target traps in the centre (see diagrams 522, 523), then forming a square with rounded corners (see diagram 524) and finally the fully-loaded square target array (see diagram 525). In this example, the fully-loaded target array (see diagram 525) is obtained after 195 moves from the initial loading (see diagram 521).

In general, the chosen first trap can be a loaded trap or an unloaded trap. It the first target trap is an unloaded trap, the first layer to be loaded is an incomplete layer that is the closest to the first target trap.

Figure 1A:
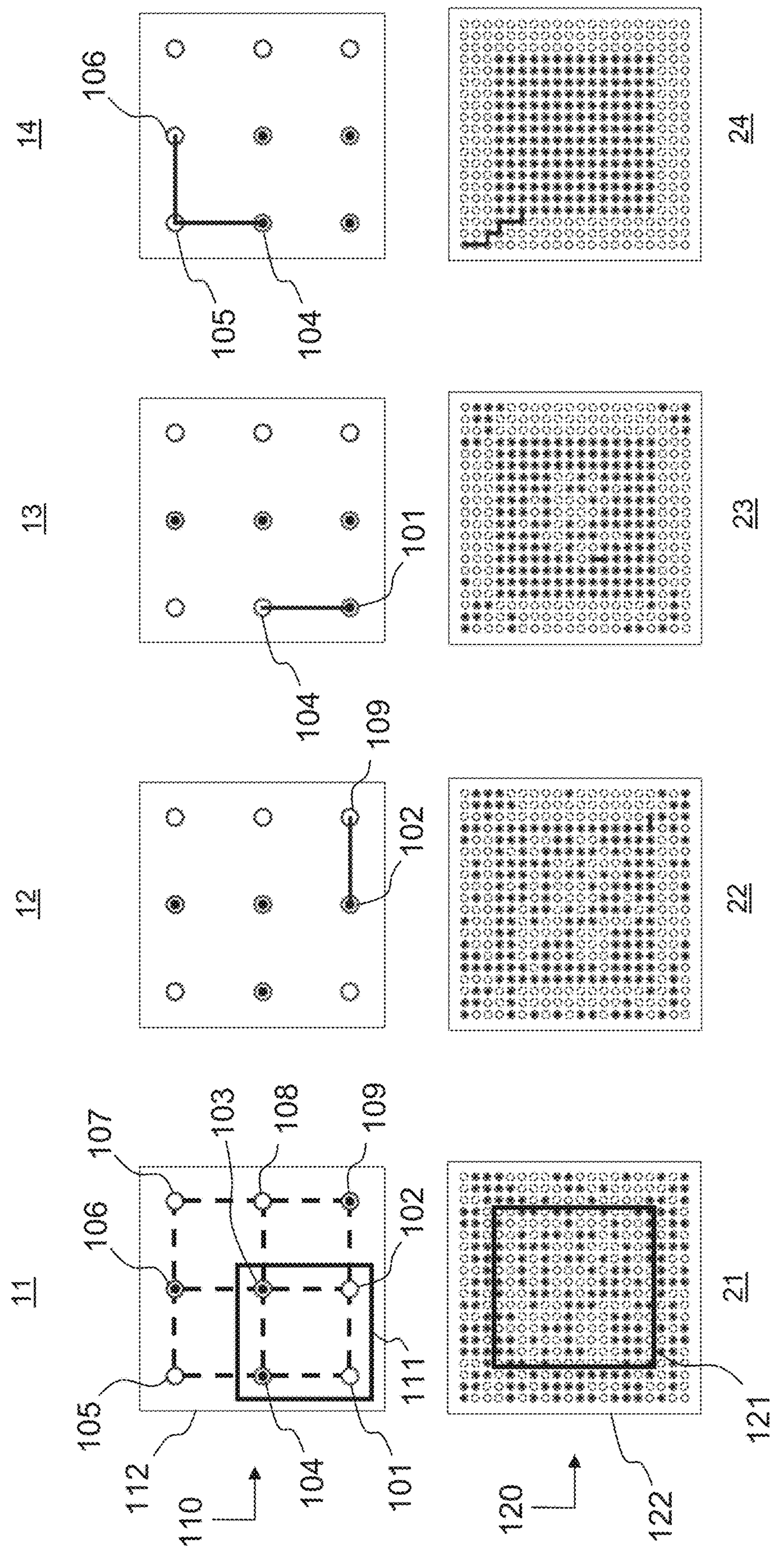
FIG.1A PRIOR ART
FIG. 1A (PRIOR ART), series of diagrams illustrating examples of a rearrangement of atoms in an array of optical traps using a "shortest-moves-first" method according to the prior art.
Figure 1B:
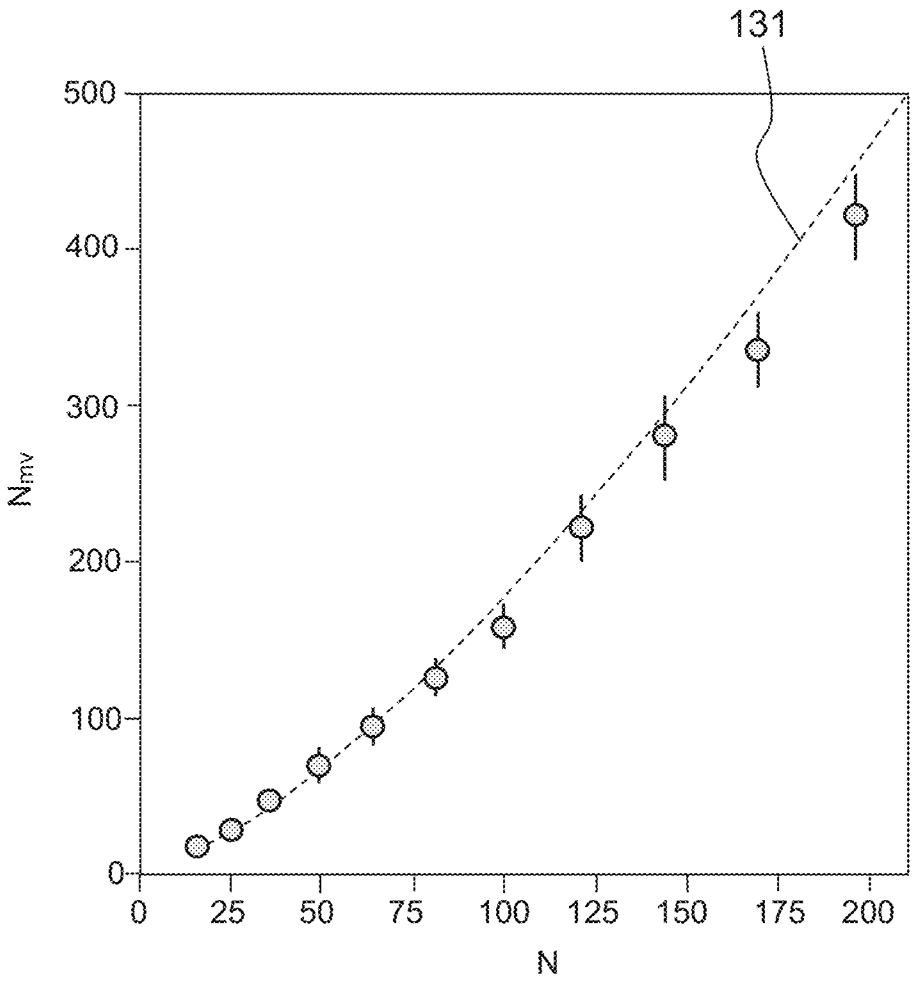
FIG.1B PRIOR ART
FIG. 1B (PRIOR ART), a graph illustrating the required number of moves to obtain a fully loaded target traps array with respect to the number of atoms in the traps array, using the "shortest-moves-first" method according to the prior art.

Arranging atoms in the array represented in series 520 from the same initial configuration using the shortest-moves-first algorithm of the prior art (see series 120 in FIG. 1A), takes a larger number of moves (444 moves) than when using the compression algorithm.

With the compression algorithm, atoms which initially occupy target traps can be displaced, which means additional moves with respect to an optimal solution. But, as we always use the closest atoms to the border of the compact structure to assemble it, the path is always collision-free and therefore we do not need any post-processing. Consequently, each atom is moved at most once during the assembly 212, which sets an upper bound on the number of moves: $N_{mv} \leq N$ and ensures on average a smaller number of moves using the compression algorithm with respect to algorithms of the prior art, for example the aforementioned shortest-moves-first algorithm.

As $N_{mv}$ cannot be lower than N/2 on average, the sequence of moves calculated with the compression algorithm, while not optimal for many different initial loading of the traps array, is generally close-to-optimal.

FIG. 5B represents two graphs 530, 540 illustrating a comparison between the efficiency of a method according to an embodiment of the present description and a method according to the prior art. The graph 530 represents histograms showing the statistical distribution $P_N$ of the number of moves $N_{mv}$ used to rearrange the atoms of a traps array over 1000 different initial loading for two different algorithms. The traps array used in the simulation is the traps array 122 represented in series 520 in FIG. 5A, wherein the number N of target traps is 196. The graph 540 represents the scaling of the number of moves $N_{mv}$ with the number of target traps N for the shortest-moves-first algorithm (curve 541) and for the compression algorithm (curve 542). Error bars are the standard deviation of the distribution and dotted lines are numerical fits of the curves 541, 542.

In graph 530, the histogram 531 correspond to a case wherein the sequence of moves is calculated with the shortest-moves-first algorithm of the prior art and the histogram 532 corresponds to a case wherein the sequence of moves is calculated with the compression algorithm 224 according to the present description.

The histogram 531 has a broad distribution that is not bounded and is centered around 420 moves. The histogram 532 has a narrower distribution (strongly sub-Poissonian and asymmetric) which is bounded by N (196 target traps) and centered around 180 moves.

Graph 530 shows that the shortest-moves-first algorithm generally requires a larger number of moves than the compression algorithm for a compact target array such as the target array 121. This is notably due to the fact that, in the case of the shortest-moves-first algorithm, many collisions can arise during the rearrangement due to the compactness of the target array and many additional moves are required to avoid the collisions. By contrast, with the compression algorithm, the collisions do not occur as the rearrangement is done layer by layer, and the algorithm remains efficient.

Histogram 532 also shows that, in the case of the compression algorithm, the number of moves never exceeds the number of target traps N and the success probability of the assembly process is more reliable, as compared to the shortest-moves-first algorithm wherein the number of moves is not bounded.

Graph 540 shows that the compression algorithm provides a number of moves that is approximately linear with N (line 542), whereas the shortest-moves-first algorithm provides a number of moves that is growing faster with N, scaling in $N^{1.4}$ (line 541). Therefore, when arranging a large number of atoms (for example superior to about 100) the compression algorithm is significantly more efficient that the shortest-moves-first algorithm.

The examples illustrated in FIGS. 5A-5B relate to the arrangement of atoms in a compact target array however the compression algorithm can also be used to arrange atoms in arrays with different types of geometry.

In view of minimizing the number of moves and finding an optimal set of moves, it can be interesting to revisit the rearrangement problem as a Linear Sum Assignment Problem (LSAP) which is a type of problem that can be encountered in industry: planning, routing, logistics, motion of robotic arms. These problems are generally solved using an LSAP solver comprising a minimization of a cost function, said cost function depending on the specificities of the problem considered.

However, a direct application of a LSAP solver with the travel distance of the sequence of moves as a cost function does not yield a collision-free assignment and requires post-processing, which generally increases the number of moves.

FIG. 6 relates to alternative rearrangement algorithms, according to the present description, namely the split-merge algorithm 228 and the reordering algorithm 226. The two algorithms first use a LSAP solver with a particular cost function to calculate an initial sequence of moves and then reprocess the initial sequence of moves in order to avoid collisions. The split-merge algorithm uses the sum of the travel distances of all the moves as the cost function, while the reordering algorithm uses the sum of the squared travel distances of all the moves as the cost function.

The LSAP solver that is used can be, for example, a solver based on a Joncker-Volgenant algorithm with no initialization. This algorithm can, for example, be implemented using the "scipy.optimize" package and the Python software.

The two algorithms 226, 228 are both very efficient in terms of the number of needed moves. Diagram 611 illustrates initial sequences of moves calculated with the two algorithms; diagram 613 represents a rearrangement of atoms using the split-merge algorithm; diagram 615 represents a rearrangement of atoms using the reordering algorithm; and graph 617 represents the number of moves as a function of the number of target traps for different rearrangement algorithms.

In the example illustrated in diagram 611, when applied to the same simple target array comprising two loaded reservoir trap and two unloaded target traps arrange in a line, the two algorithms can favour different initial sequence of moves due to their different cost function.

The reordering algorithm favours an initial sequence of moves comprising two moves (for a total cost of 8), each move comprising two unit allowed paths over a sequence of moves comprising a move with one unit allowed path and a move with three unit allowed path (for a total cost of 10). Conversely, the split-merge algorithm finds the two sequences of moves as equivalent (a total cost of 4 for each sequence). The reordering algorithm tends to favour an initial sequence of moves with shortest moves compared to the split-merge algorithm (and avoiding long moves).

In both cases, the initial sequence of moves is post-processed to eliminate collisions and reduce the number of moves. The post-processing steps differ between the split-merge algorithm and the reordering algorithm.

Diagram 613 and diagram 615 show the rearrangement of atoms in an example of a traps array comprising five reservoir traps (traps numbered 0, 1, 2, 3 and 9) and five target traps (traps numbered 4, 5, 6, 7 and 8), arranged in a line. In this example, an initial loading of the traps array causes the loading of traps numbered 0, 2, 5, 8 and 9. The goal of a rearrangement algorithm is then to re-arrange the atoms from traps 0, 2, 9 to the target traps 4, 6 and 7.

In the example illustrated in diagram 613, the split-merge algorithm is applied to this configuration and yields an initial sequence of moves 623, comprising a first move (2, 3, 4), a second move (0, 1, 2, 3, 4, 5, 6); and a third move (9, 8, 7). In the present description, (2, 3, 4) means that the atom in the initial trap 2 is first moved to trap 3 and then from trap 3 to final trap 4. The initial sequence of moves is then post-processed in a few steps.

First, the collisions in the initial sequence 623 are identified. In the example illustrated in diagram 613, the second move and the third move comprise collisions (the collisions are indicated with a circle on the traps that comprise obstructing atoms).

In a "split" step, the moves comprising collisions are split between sub-moves to remove the collisions (also called obstacles in the present description), yielding sequence of moves 624, that comprises six moves.

In a "merge" step, the moves of the sequence of moves 624 that have the same trap as an initial trap and a final trap are merged together in order to form a final sequence of moves 625. Specifically, in the example of diagram 613, move (2, 3, 4) and move (4, 5) are merged together to form move (2, 3, 4, 5). Advantageously, the merge step reduces the number of moves, which can speed up the rearrangement process. Before merging, a check is implemented to ensure that is does not introduce a collision. If a collision would be introduced by the merging, the sub-moves are left as two separate moves Although this merging step could in principle be applied to other rearrangement algorithms, the smallest number of moves is obtained when starting from a sequence of move calculated with an LSAP solver. The computation time for the whole split-merge algorithm (LSAP solver, split step and merge step) is on average 4 ms for 100 target traps in a non-compact target arrays (with a checkerboard geometry), and roughly scales as $N^2$ with the number of target traps.

In the example illustrated in diagram 615, the reordering algorithm is applied to the same configuration as before and yields an initial sequence of moves 626, comprising a first move (0, 1, 2, 3, 4), a second move (2, 3, 4, 5); a third move (5, 6), a fourth move (8, 7), and a fifth move (9, 8).

The moves of the sequence of moves 626 are then reordered following a reordering procedure. In said procedure, the moves are examined one-by-one starting from the beginning of the sequence and reordered according to the following rule:

If a move comprises:

a final trap that is already loaded (case 1);

a trap other than the final trap that is already loaded (case 2); or a final trap that is in the path of another move (case 3);

the move is placed at the end of the sequence of moves and, if it does not, it is left at the same place in the sequence. The next move in the sequence is then examined according to the same rule until all the moves have been examined.

This reordering procedure comes down to postponing the moves causing collisions towards the end of the sequence. The applicant observed that this procedure advantageously provides a final sequence of moves that does not comprise any collisions.

The whole reordering algorithm (LSAP solver and reordering procedure) has an average computation time of 4 ms for N=100 target traps in a compact target array, and scales roughly as $N^2$.

In the example illustrated in diagram 615, firstly, the first move in sequence of moves 627 is examined. The first move (0, 1, 2, 3, 4) comprises a trap following case 2 (the trap 2) and a trap following case 3 (trap 4), it is then postponed and placed at the end of the sequence, forming the sequence of moves 627.

Afterwards, the second move of sequence 626, which has become the first move of sequence 627, is examined. This move (2, 3, 4, 5) comprises a trap following case 1 (trap 5), therefore it is postponed and placed at the end of the sequence 627 to form sequence 628.

Afterwards, the move (5, 6) is examined. It does not comprise traps in any of the three cases, so it is left at its place in the sequence 628.

Afterwards, the move (8, 7) is examined. It does not comprise traps in any of the three cases, so it is left at its place in the sequence 628.

Afterwards, the move (9, 8) is examined. It does not comprise traps in any of the three cases, so it is left at its place in the sequence 628.

Afterwards, the move (2, 3, 4, 5) is examined. It comprises a trap in case 3 (trap 4), therefore it is postponed and placed at the end of the sequence 628 to form the final sequence 629.

As all the moves of the initial sequence 627 have been examined, the procedure stops. In this example, the output of the algorithm is the final sequence of moves 629.

For the sake of simplicity, the traps array used in the examples illustrated in FIG. 6 are one-dimensional line arrays, however the split-merge algorithm and the reordering algorithm are generally used to rearrange atoms in other traps arrays, for example two-dimensional arrays of optical traps.

Whatever the geometry of the target array, the maximum number of moves calculated with the reordering algorithm is bounded by N, the size of the cost matrix.

In FIG. 6, graph 617 shows the number of moves $N_{mv}$ as a function of N when calculated with the split-merge algorithm (triangle markers) or with the reordering algorithm (disk markers) for three arrays with different geometries: a compact array (markers 641), a random array (markers 642), and a checkerboard array (markers 643), The three arrays are the arrays 231, 232, 233 represented in FIG. 2B, respectively.

The graph 617 also shows, for the sake of comparison, the number of moves calculated with the shortest-moves-first algorithm of the prior art, for the compact array (line 631), for the random array (line 632) and for the checkerboard array (line 633).

For non-compact arrays, the number of moves returned by the split-merge algorithm is smaller than for the reordering algorithm (see markers 642, 643). Therefore, the split-merge algorithm is particularly adapted to the rearrangement of atoms in non-compact arrays.

For compact arrays, the number of moves returned by the reordering algorithm is smaller than for the split-merge algorithm (see markers 641). Therefore, the reordering algorithm is particularly adapted to the rearrangement of atoms in compact arrays.

The performance of the split-merge algorithm is very satisfactory for non-compact target arrays (checkerboard array or random arrays) as the number of moves is only about 20% to about 30% higher than the absolute lower bound N/2.

In the case of compact arrays, the split-merge algorithm gives essentially the same performance as the compression algorithm (see, for comparison, FIG. 5B, diagram 540, line 542). However, the compression algorithm has the advantage of being faster for the calculation of the moves when N>Nc, wherein Nc is a threshold that can depend on the specific implementation of the algorithm (for example programming language and libraries used) and on the specific computer hardware (for example amount of available RAM, clock speed and number of cores of the CPUs). Nc can for example be approximately equal to 300.

For compact arrays, the number of moves returned by the reordering algorithm is slightly larger than N, making this approach less efficient than the compression algorithm described above.

The conclusions drawn from FIG. 6 can be taken into account when choosing an algorithm based on the geometry of a target array (see FIG. 2B).

Although the split-merge algorithm and the reordering algorithm are particularly adapted to target arrays with specific geometries, they can be used to arrange atoms in target arrays with other geometries.

While the invention has been described with respect to a limited number of embodiments, those skilled in the art, having benefit of this disclosure, will appreciate that other embodiments can be devised which do not depart from the spirit of the invention as disclosed herein.

Accordingly, the scope of the invention should be limited only by the attached claims.

The invention claimed is:

1. A method for arranging atoms in a target array of optical traps with predefined positions comprising:

generating a given number of target traps at said pre-defined positions;

generating reservoir traps, said reservoir traps and said target traps forming a traps array;

defining allowed paths between traps of the traps array;

loading atoms in the traps array to generate an initial loaded traps array;

determining the positions of the atoms in the initial loaded traps array;

calculating a sequence of moves using a rearrangement algorithm based on said initial loaded traps array and said allowed paths; and applying the sequence of moves to rearrange the atoms in the traps array and form a final loaded traps array wherein:

generating reservoir traps comprises computing a Voronoi diagram of the target traps to define Voronoi cells; and generating each reservoir trap in a Voronoi cell and wherein defining allowed paths between traps of the traps array comprises a Delaunay triangulation.

2. A method as claimed in claim 1, wherein determining the positions of the atoms in the initial loaded traps array comprises acquiring an initial fluorescence image of the initial loaded traps array.

3. A method as claimed in claim 1, wherein the target traps array is compact and said algorithm is a compression algorithm and comprises:

electing a first target trap among the target traps;

defining a first layer that is nearby to the first target trap using the allowed paths;

defining candidate traps in the first layer, said candidate traps being chosen among the optical traps of the first layer that are loaded with an atom;

defining a first move of an atom from one of the candidate traps to the first target trap;

an iterative procedure comprising:

defining a layer to load, said layer to load being an incomplete layer that is nearby to the first target trap or to a layer that has been fully loaded with at least one of the preceding moves;

defining a candidate layer, said candidate layer being a layer that is nearby to the layer to load and has not been loaded with any of the preceding moves;

defining subsequent moves of atoms from the candidate layer to the traps of the layer to load that are not loaded with an atom until every unloaded trap of the layer to load is loaded with an atom; and repeating the iterative procedure until all the target traps of the traps array are loaded with an atom.

4. The method as claimed in claim 1, wherein said algorithm is a split-merge algorithm and comprises:

calculating, using a minimization of a cost function with a linear sum assignment solver, a preliminary sequence of moves to move atoms from reservoir traps of the traps array to target traps, each move being done on at least one of the allowed paths; wherein said cost function comprises a sum of the distances of the moves used to move atoms along allowed paths;

determining collisions among the preliminary sequence of moves, said collisions comprising the moving of an atom through an optical trap that is loaded with an atom;

splitting moves comprising collisions into at least two sub-moves to form a new sequence of moves that does not comprise collisions;

merging sub-moves that have the same trap as an initial trap and a final trap to form the modified sequence of moves.

5. The method as claimed in claim 1, wherein the target traps array is compact and said algorithm is a reordering algorithm and comprises:

calculating, using a minimization of a cost function by a linear sum assignment solver, a preliminary sequence of moves to move atoms from reservoir traps of the traps array to target traps, each move being done on at least one of the allowed paths; wherein said cost function comprises a sum of the squared distances of the moves used to move atoms along allowed paths;

reordering the preliminary sequence of moves to postpone the moves comprising collisions in order to form the modified sequence of moves.

6. The method as claimed in claim 1, further comprising:

determining the positions of the atoms in the final loaded traps array;

determining a number of defects in the final loaded target traps array.

7. The method as claimed in claim 6, wherein determining the positions of the atoms in the final loaded traps array comprises acquiring a final fluorescence image of the final loaded target traps array.

8. The method as claimed in claim 6, further comprising, if the number of defects is non-zero, rearranging again atoms in the loaded traps array using a new sequence of moves calculated with said algorithm.

9. The method as claimed in claim 8, wherein said rearrangement of atoms in the loaded traps array is repeated a plurality of times in order to obtain a fully-loaded target traps array.

10. A quantum processing system comprising:

an optical set-up configured to generate single laser-cooled atoms trapped in an array of optical traps, wherein said array comprises targets traps whose positions are predefined by a user and that form a target traps array, and reservoir traps;

means for moving said atoms in said optical traps array;

a control unit configured to arrange said atoms in the optical traps array using said means, wherein the control unit is configured to implement a method according to claim 1 in order to obtain a fully loaded target traps array.

11. The quantum processing system as claimed in claim 10, wherein the positions of the optical traps are defined with a spatial light modulator.

12. The quantum processing system as claimed in claim 10, wherein the means for moving said atoms in said optical traps array comprise an acousto-optic deflector.

* * * * *